United States Patent [19]
Beaudette

[11] 3,991,267
[45] Nov. 9, 1976

[54] METHOD FOR PRODUCING A COMPRESSED DIGITAL REPRESENTATION OF A VISIBLE IMAGE

[75] Inventor: Charles G. Beaudette, Waltham, Mass.

[73] Assignee: EG & G, Inc., Bedford, Mass.

[22] Filed: Oct. 23, 1975

[21] Appl. No.: 625,149

Related U.S. Application Data

[63] Continuation of Ser. No. 207,213, Dec. 13, 1971, abandoned, which is a continuation-in-part of Ser. No. 5,642, Jan. 26, 1970.

[52] U.S. Cl. .............................. 178/6; 178/DIG. 3
[51] Int. Cl.² ......................................... H04H 7/12
[58] Field of Search ................... 178/6.8, 6, DIG. 3; 325/38 B

[56] References Cited
UNITED STATES PATENTS

| | | | |
|---|---|---|---|
| 3,378,641 | 4/1968 | Varsus et al. | 179/15.55 |
| 3,686,631 | 8/1972 | Elliott | 340/146.3 H |

*Primary Examiner*—Robert L. Griffin
*Assistant Examiner*—Edward L. Coles
*Attorney, Agent, or Firm*—Kenway & Jenney

[57] ABSTRACT

Lines on an image are optically scanned in sequence for image density at spaced intervals. Binary line scan functions are produced to represent the densities of the samples. These functions are translated into equivalent binary line codes of substantially reduced redundancy and length. Translation is accomplished by generating codes defining the variations of each line scan function from that of the previous line.

10 Claims, 8 Drawing Figures

METHOD FOR PRODUCING A COMPRESSED DIGITAL REPRESENTATION OF A VISIBLE IMAGE

This is a continuation of application Ser. No. 207,213 filed Dec. 13, 1971, now abandoned, which is a continuation of my application Ser. No. 5,542 filed Jan. 26, 1970.

BACKGROUND OF THE INVENTION

The use of digital equipment to store, transmit and reproduce visible images, both moving and stationary, has become firmly established in such arts as television, telemetering, photography, facsimile transmission, printing and related arts. Samples of the image density are taken at spaced intervals and their densities are represented in digital form. Binary codes are most frequently employed because of their simplicity.

A well-known procedure is to scan the image along closely spaced lines in succession, optionally sampling the density at spaced intervals along each line and producing a binary code for each sample representing its density. The sequence of such codes, called a "binary line scan function", may be stored, transmitted or otherwise used in digital equipment to represent the line. However, in order to conserve digital storage capacity and to reduce the length of the codes for other reasons, workers have made use of the fact that when line scan functions are analyzed statistically they are found to contain substantial redundancy, also called "entropy". In recognition of this, prior workers have developed a technique called "run length coding". An equivalent line code consisting of a sequence of run length codes is produced for each line, the codes successively representing "black runs" and "white runs", each such code specifically representing the length of the corresponding run. A "run" as defined is an uninterrupted sequence of either black or white samples. A measurement is made of the frequencies of appearance of different run lengths in graphic material of the general type to be encoded. Codes of varying numbers of digits are then defined and assigned to run lengths on the basis of frequency with the lengths of greatest frequency having the shortest codes. The result is an equivalent line code characterized by a substantial but inherently limited reduction in redundancy.

In some prior facsimile systems an analog signal was derived from the optical scan and transmitted in like form, usually after amplification and frequently after modulation on a suitable carrier frequency. However, such systems had practical limitations that precluded their use on communication channels of the type envisioned by this invention at the speeds and with the resolution attainable by the latter. They also required substantial analog storage capacity in cases where storage of facsimile data was required. Both of these distinctions also apply to prior systems in which the analog signal was sampled at a rate determined by the desired resolution and directly converted for storage or transmission to a binary or other digital equivalent.

The inadequacies of these earlier systems may be illustrated with a specific example. Suppose it is desired to transmit an original copy 18 inches wide and 27 inches long in 15 minutes, with a resolution of 0.01 inch in both dimensions. This implies that the detector 11 must travel at a rate of 0.03 inch per second, and since the desired resolution requires a line spacing of 0.01 inch, three lines are scanned per second. In any digital system this resolution further requires 1800 samples per line. Therefore, the system must transmit 5400 samples per second, and if each sample is represented either as a "0" or a "1" (respectively representing white and black,) this means a transmitted bit rate of 5400 Hz. Also, to store the copy in binary code it would require a storage capacity of 4.86 million bits.

The bit rate imposes a definite requirement on the bandwidth of the communication channel. Some channels could not be employed for this reason. For example, A.T. & T. Co. Schedule 4B and Western Union Tel Co. Schedule F voiceband data transmission channels are designed for signals of 600 to 3000Hz. They provide a bandwidth of 2400 Hz. which can, by use of digital transmission techniques, transmit 4800 bits per second.

It is therefore evident that for a given resolution there are both storage capacity requirements and limitations imposed by the combination of the available bandwidth for transmission and the desired rate of producing copy (15 minutes in the above example). As a result, when the latter rate is prescribed certain transmission channels are seen to be inadequate.

SUMMARY OF THE INVENTION

This invention is based on a recognition that adjacent pairs of lines in graphic images of many types have substantial although varying degrees of similarity. Stating this in another way, the locations and lengths of black and white runs in a given line are frequently the same or substantially the same as they are in an adjacent line. The invention is embodied in a method of translating facsimile data in which advantage is taken of these redundancies present in the graphic copy. By substantial reduction in or elimination of the redundancies it is possible to reduce the number of bits required to reproduce the copy very substantially below the number of samples taken by the photoelectric detector, without sacrifice of resolution. This results in the ability to store the copy in digital form with fewer bits, and in faster rates of producing copy for a given transmission bandwidth; and conversely, it permits the use of channels of limited bandwidth for transmission at faster copy rates.

In the method each binary line scan function is translated into an equivalent line code of substantially shorter length. First, the line scan functions of two adjacent lines are compared sample by sample until a difference incorresponding samples is noted and its uninterrupted length ascertained. Then a code is produced defining the difference. The comparison is then resumed until another difference is similarly ascertained, and a second code is produced, repeating the steps to the end of each line.

The foregoing method of line comparison includes both function recognition, that is, detection of the differences between the lines, and measurement of the extents or lengths of uninterrupted sequences of samples embodying such differences. These operations may be performed manually or automatically. The result is a very substantial reduction, of the order of four or more magnitudes in some cases, in the length of the codes needed for commonly used graphic material, as compared with run length coding.

THEORY OF METHOD

Figure 1:
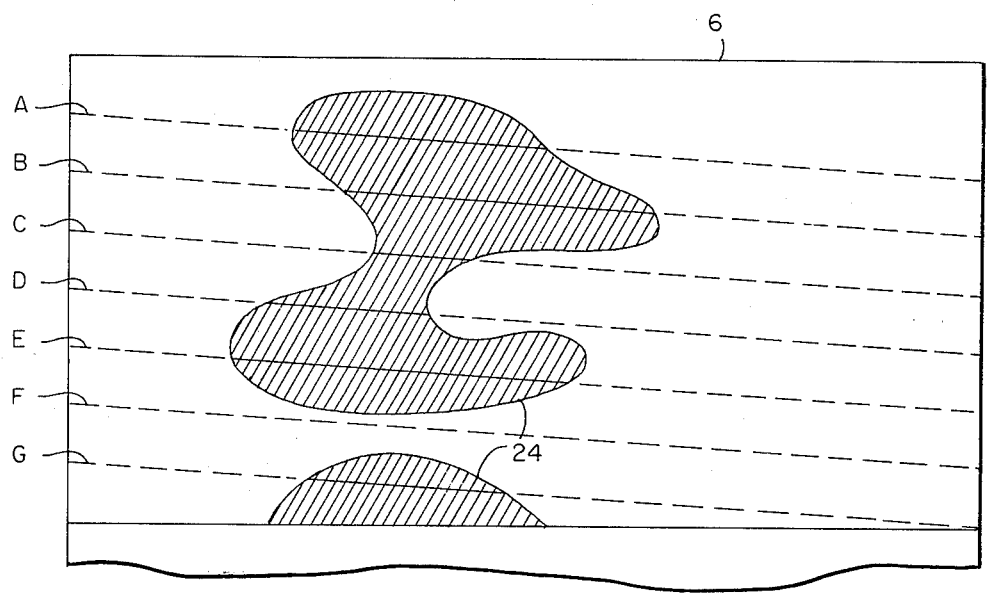
FIG. 1 is a diagrammatic representation of a sheet containing graphic material to be encoded.
Figure 2:
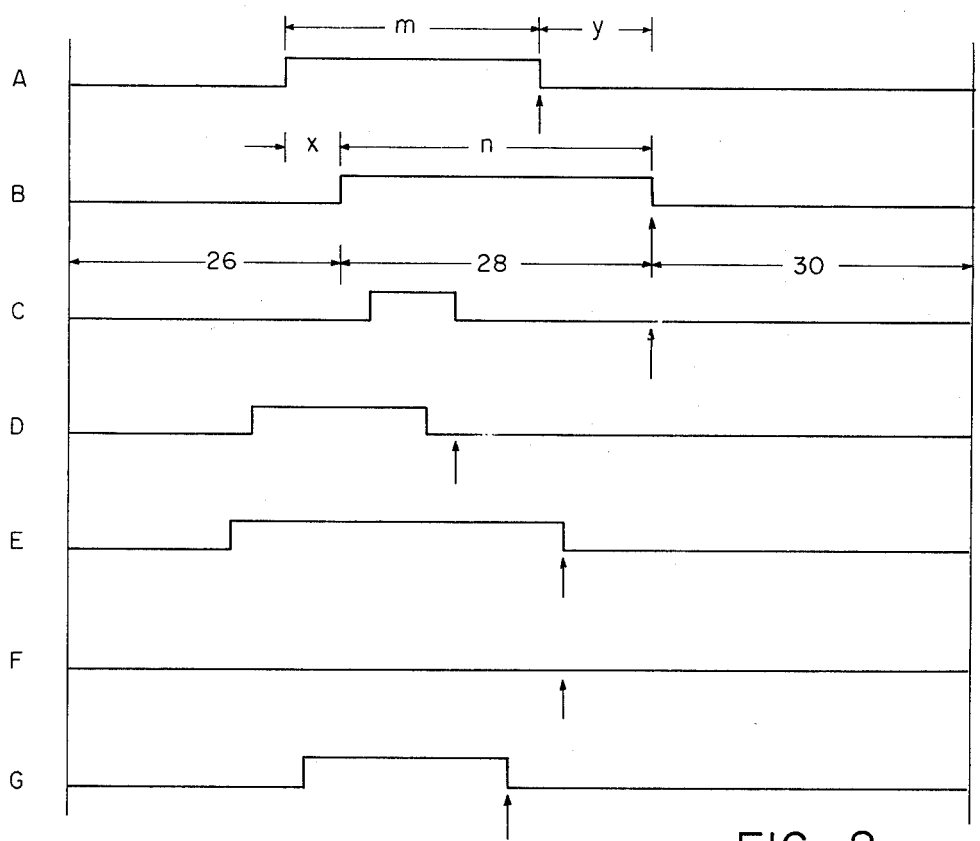
FIG. 2 is a chart representing the scan lines in FIG. 1 as step functions of their densities.

An understanding of the theory behind the system in which this invention is embodied may be gained by first considering an exemplary original white graphic copy sheet 6 having black areas 24 as shown in FIG. 1. In scanning this copy the detector describes a succession of scan lines A to G. The scanning of line B commences without interruption after line A, line C after line B, and so on. The continuous analog signal produced by a detector has two amplitude levels, arbitrarily termed "up" when the reflecting spot on the copy is black and "down" when it is white. FIG. 2 is a diagram showing the analog signals produced by the given lines.

Run length coding provides a method of eliminating some redundancy in the transmission of the given line scan signals, which can be explained in the case of lines A and B. Assuming that there is provision to synchronize the lines, run length coding provides for transmitting line B by means of the following:

1. a signal representing the length of a "white run length" 26,
2. a signal representing the length of a "black run length" 28, and
3. a signal representing the length of a white run length 30.

These lengths would be the same regardless of the variations in line A, but the codes for the run lengths would be shorter for those more frequently occurring.

Because of characteristics inherent in graphic subject matter, there is a high probability that successive lines will be substantially alike, that is, that their white and black runs will start at about the same points and have about the same lengths. This probability is not completely exploited in run length coding. As an extreme case, if line B had been identical to line A it would not have been theoretically necessary to retransmit signals (1) to (3) for line B once line A had been transmitted, assuming that the receiver has a property enabling it to reconstruct a line previously received and reproduced. It would only have been necessary to send a code representing the fact that the "new" line B should be reproduced with the same runs as the "old" or next preceding line A. The same observation would also apply to the recording of line B in a recorder.

In the more generalized case represented by lines A and B the runs go "up" or black at different points and have different lengths, although the difference in both cases may be relatively small. To account for these differences the present method presupposes the ability of the receiver or code reader to refer to the old line A to ascertain both the point of starting, identified by a transition in a first or up direction inthe scan function, and the length of its black runs (identified as the length between an up transition and the next transition in the opposite direction), and requires transmission of the following for new line B:

1. a signal (herein called "delta I") representing the distance "$x$" by which the starting point of the new black run is shifted in relation to the old one, including the direction (to the left or right), and
2. a signal (herein called "delta II") representing the difference "$n$-$m$" in the lengths of the black runs, including the sense (decrease or increase in length).

These signals are sufficient to define line B completely, but statistically require substantially fewer transmitted or stored bits than the redundant methods previously described.

Lines A to E represent various exemplary relationships of contiguous lines, each successive pair of lines having overlapping black runs. The existence of an overlap characterizes these line relationships as "delta" functions.

Line F represents a different situation in which no black run overlaps the black run in line E. This is called a "merge" function. In this case, for line F it is only necessary to transmit or store a merge code simply calling for the elimination of a black run in the location where such run appeared in line E.

Line G represents a third situation called a "new start" function in which a black run appears but does not overlap a black run in line F. In this case, for line G it is necessary to transmit or store sufficient data to define the new black run, which may be done by transmitting the following:

1. a new start signal to differentiate this function from a delta function,
2. the length of the white run preceding the black run, and
3. the length of the black run.

To carry out the method herein described in a more general case, in which there are more than one black runs per line, it is necessary to add an additional concept, namely that of "line segments". Each line, considered as a new line is made up of a number of contiguous segments of different lengths. Each segement is characterized by a delta, merge or new start function with respect to the identical segment in the preceding line considered as the old line. Therefore, to define each new line completely it is necessary to derive a sequence of codes or groups of codes representing consecutive segments of the line. The lengths of these segments are variable because they depend on the function observed, that is, they depend on the particular graphic copy being transmitted and specifically on the relationship of the old to the new line. In FIG. 2 the end of the first segment of each line is represented by an arrow. It will be apparent that in a more common case there will be more than one arrow in each line. The arrows are located at the earliest points, in the left-to-right progressive comparison of each line with the next preceding line, at which one of the above functions can be quantitatively ascertained and its corresponding signals transmitted.

OPERATION OF METHOD

The method of this invention may be performed manually or automatically. The manual procedure will be evident from the following description of apparatus adapted to carry out the method automatically. The apparatus is described in relation to an embodiment shown in block diagram in FIG. 3. This embodiment is capable of digital facsimile storage in a tape recorder 3; or transmission over a telephone line or other communication link such as radio, from a scanner 4, upon which an original graphic hard copy sheet 6 is mounted, at the transmitter to a facsimile recorder or hard copy reproducer 7 mounted at the receiver. The apparatus may employ any known scanner, transmission link or recorders compatible in operation with the other elements as described below. A basic consideration of design is that the equipment shall produce a code of minimum length capable of representing digitally a given area of original graphic hard copy 6 with a given fineness of detail, hereinafter referred to as "resolution".

The original illuminated copy sheet 6 is mounted upon a continuously rotating scanner drum 8, with the top of the sheet shown by the word TOP and with the left margin on a line 9. A lead screw 10 rotated by a motor M, causes a photoelectric detector 11 to move parallel to the drum axis, thereby detecting variations in light reflections in the copy along a helix of lines 12, and producing a continuously varying analog line scan signal having like variations. In general, this scanner is of conventional form provided, however, that the motor M may be controlled by a signal from program control unit 44 to speed up or slow down the scan rate. The basis on which this control signal is supplied will be explained in more detail below. The detector must have adequate resolution, which requires that its sensitivity be limited to a sufficiently small moving spot illuminated by suitable means such as a fiber optical or equivalent lens illuminator. Resolution is also determined by the spacing of the lines 12.

The analog signal is sent to a transmitter 13 which transmits coded pulses to the tape recorder 3 and/or through a suitable wire or wireless communication channel 14 to a receiver 16 associated with a decoder 17 and the copy recorder 7.

The operation of this apparatus will be described with reference to the numerical example discussed above, in which 18 inch lines are scanned at a nominal rate of three per second and 1800 sample bits are taken in each line. The operation comprises a sequence of steps conveniently described with reference to the time period in which each line is scanned from end to end, termed a "scan period". These scan periods follow in sequence without interruption as the drum 8 rotates continuously.

In the first scan period a first full line is entered in an 1800-bit "input memory" 32. In a brief interval at the end of the first scan period, the contents of the memory 32 are transferred to an 1800-bit "new memory" 34. By the end of the second scan period full line is entered in the memory 32. In a brief interval at the end of the second scan period the contents of the memory 32 are again transferred to the memory 34 and the contents of the memroy 34 are transferred to an 1800-bit "old memory" 36. By the end of the third scan period a third full line is entered in the memory 32. The fourth and succeeding scan periods repeat the foregoing transfers and any line in the memory 36 is erased as another line is transferred to it.

It can be seen that entry of lines into the memory 32 cannot proceed faster than the time required to scan these lines, but entry into the new and old memories 34 and 36 takes place in a very short interval at the end of each scan period, and therefore the lines are retained in these latter two memories throughout substantially the full duration of each scan period.

During each scan period a comparison circuit 38 compares the data in the memories 36 and 34, referred to as the old and new lines, respectively. The comparison proceeds by examining the stored bits in both lines seriatim, that is, the first bits in the old and new lines are simultaneously examined, then the second bits, and so on. This continues until one of the functions delta, merge or new start has been defined, thus marking the end of a first segment to be transmitted and temporarily arresting the process of comparison.

The foregoing comparison is carried out in such a manner that the appropriate signals for the particular function, described under the preceding heading, are quantitatively determined. These signals are then translated to code form by a channel encoder 40 from which the corresponding code or codes are sent as pulse chains through a channel modulator 42 to the communication channel 14. Thereupon, the process of comparison is resumed at the position in the lines where it was previously arrested, and a second segment is ascertained, quantitatively determined, encoded and transmitted.

This procedure, like all other functions of the transmitter, is governed by program controls 44, and the generation and transmission of codes or code sequences for each segment in the new line are carried out at a sufficiently high speed to ensure transmission of all segments in the new line within a single scan period. The scanning motion of the detector should be as rapid as possible, consistent with the channel limitations on bit rate. The number of bits for each line will depend, however, on the number and magnitude of the differences between that line and the preceding line. Hence the number of bits per line and so also the optimum scanning speed is variable. In order to achieve a scanning motion close to this optimum, a feedback loop controlling a stepping motor M, which provides the scanning motion, is employed. In the feedback loop the number of bits per unit time from the channel encoder 40 is compared in comparison unit 38 to a preset value related to the channel capacity. Signals from this comparison unit are used to advance the stepping motor M to keep the bit rate from the channel encoder near this preset value.

Figure 3:
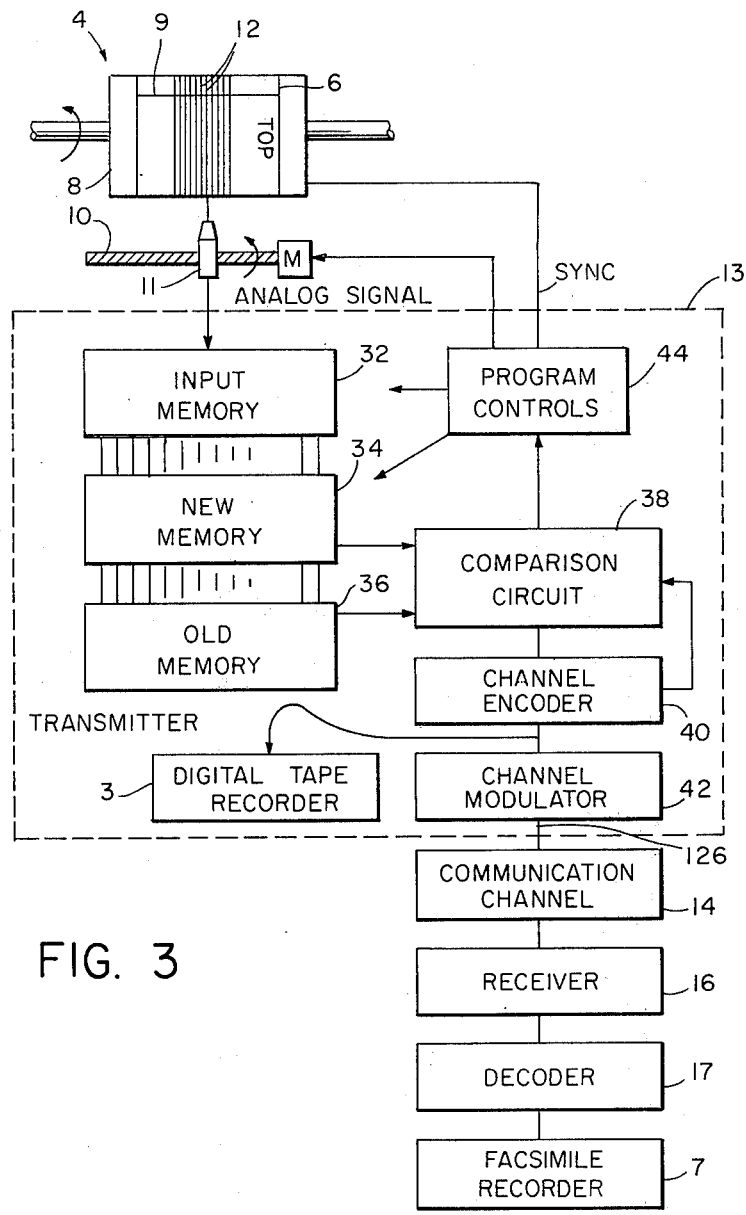
FIG. 3 is a block diagram showing a facsimile transmission system adapted to carry out the method of this invention.

The general circuit units shown in FIG. 3 may be formed using conventional circuit techniques.

FIGS. 4, 5a, 5b, 6 and 7 illustrate a specific embodiment of logic-circuitry for use in the system shown in FIG. 3. For purposes of this embodiment, the three memories, input memory 32, new memory 34, and old memory 36 will be considered to be shift registers which provide, in response to applied clock pulses a serial stream of bits at their output at the clock rate. By use of conventional techniques, the contents of the memories may be transferred to the next memory, rather than to the comparison circuit 38, by employing suitable gates and by clocking the shifting action at a very high speed in comparison to the normal clock rates.

Figures 4, 6:
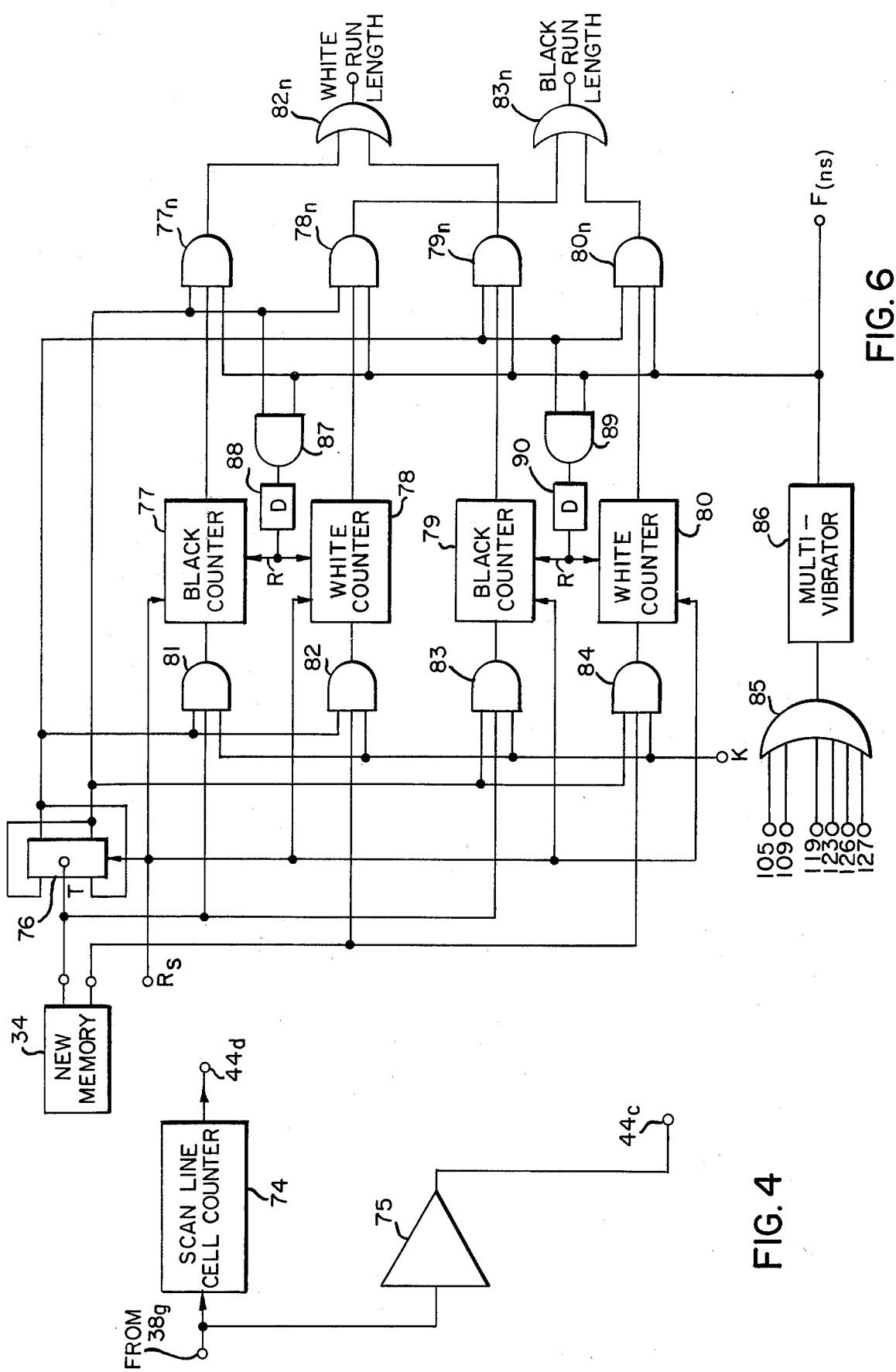
FIG. 4 is an illustration in block diagrammatic view of the elements of a program control circuit suitable for use in the program control unit 44 of FIG. 3.
FIG. 6 is an illustration in block diagrammatic form of additional logic circuitry for inclusion in the comparison circuit 38 of FIG. 3.

An internal construction for the program control 44 is shown in FIG. 4. The program control 44 includes a scan line cell counter 74 which receives pulses from comparison circuit 38 at its input and provides an output signal at terminal 44d when the number of pulses received from the comparison circuit 38 are equal to the number of bits to be included in a line. This may be accomplished by presetting the scan line cell counter 74 to provide an output signal when a predetermined number of pulses equal to the number of bits per line has been accumulated. The program control 44 also includes a power amplifier 75 connected directly to the input terminal from the comparison circuit, which provides for amplified series of clock output pulses, K, at terminal 44c, at the same rate as the pulses are supplied to the scan line cell counter 74.

Figure 5A:
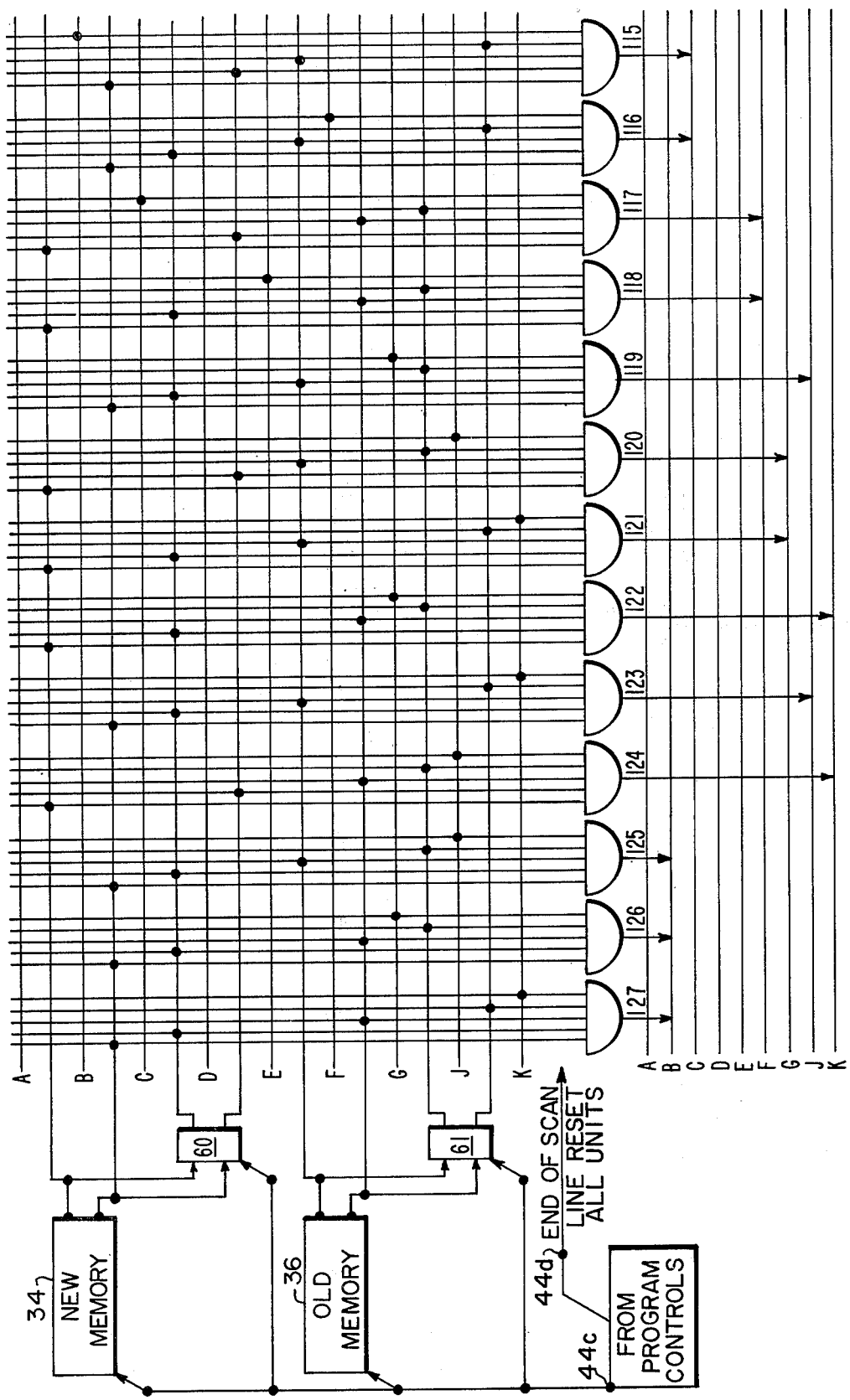
FIGS. 5a and 5b are an illustration in block diagrammatic form of logic circuitry forming a portion of the comparison circuit 38 of FIG. 3.
Figure 5B:
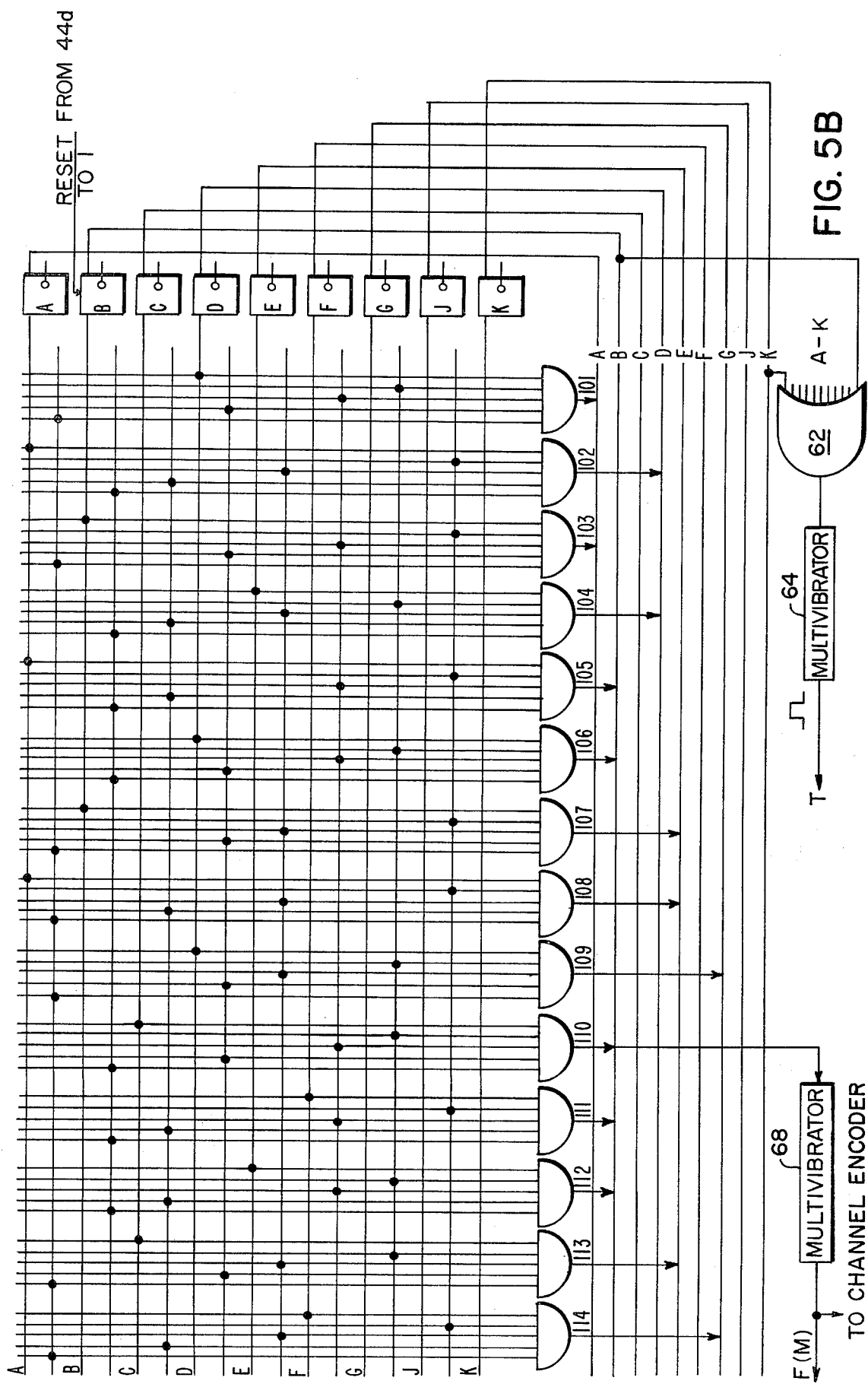
Figure 7:
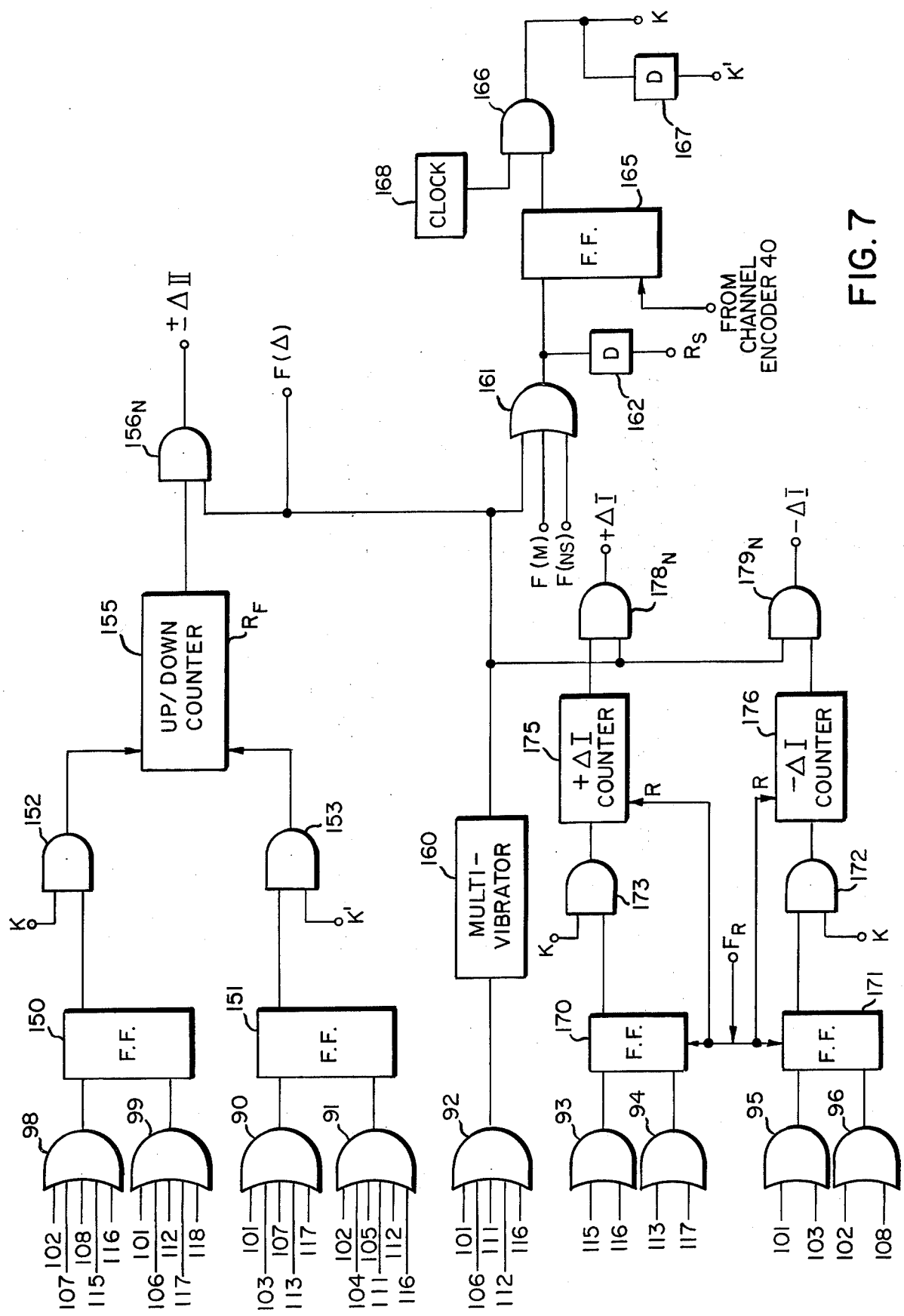
FIG. 7 is an illustration in block diagrammatic form of another portion of logic circuitry for inclusion in the comparison circuit 38 of FIG. 3.

In FIGS. 5a and 5b there is illustrated a coincidence matrix circuit providing the output pulses which determine, in conjunction with the logic illustrated in FIG. 6 and FIG. 7, not only the particular function codes which will be transmitted to the channel encoder 40, but also the quantitiative values for the functions delta-I and delta-II. The input to this matrix is supplied from the new memory 34 and the old memory 36, the zero line of the new memory 34, corresponding to white signals from the scanner 11, being supplied to one input of flip-flop 60 while the "1" output from the new memory 34, corresponding to a black signal from scanner 11, is supplied to the other input of the same flip-flop 60. Similarly the two outputs from the old memory 36 are supplied to a pair of inputs to flip-flop 61. The same two outputs from new memory 34 are supplied as direct lines to the matrix, as also are the two output lines from old memory 36. The shift pulses for the memories 34 and 36 are supplied from terminal 44c of the program control unit 44. This same terminal 44c provides shift pulses to each of the flip-flops 60 and 61. These flip-flops are shift register devices. Also supplied from program control unit 44 at terminal 44d is a reset pulse $R_s$ which appears at the end of the scan line to reset all of the units in the circuitry.

The matrix illustrated in FIGS. 5a and 5b includes as the horizontal lines of the matrix, the outputs from the new and old memories as well as from flip-flops 60 and 61, and in addition outputs from a series of flip-flops A through K. The vertical lines from the matrix consist of the inputs to a series of AND gates 101 and 127. Each of the AND gates 101 through 127 provides a positive output level in response to the conjunction of positive levels on each of its five input leads. In the diagram the use of an arrow at the output of each of the AND gates has been employed to designate an OR function. The outputs from each of the AND gates 101 through 127 are supplied not only as actuating inputs to the series of flip-flops A through K, but also are employed as inputs to the logic elements shown in FIGS. 6 and 7. Each of the input lines, designated A, through K, and corresponding to the respective flip-flops, are also coupled as one input to OR gate 62, which has its output connected to multivibrator 64, the output from the multivibrator being a positive pulse which serves as the toggle pulse for each of the flip-flops A through K. These flip-flops are shift register devices. Since the new state of the flip-flops occurs only upon the trailing edge of the multivibrator pulse then the action of this portion of the circuit establishes a correct configuration of flip-flop states in the matrix for response to the next pulse to be supplied from the new and old memories.

It is the coincidence logic of the above matrix which establishes the series of conditions set previously which define the functions new start, merge, delta-I and delta-II. This same logic controls the computation of the quantitative values of delta-I and delta-II. The logic for defining the function merge, $F_{(m)}$, is also included in FIG. 5b. An output from AND gate 101 represents the merge function and this output is supplied to multivibrator 68 and thence directly to the channel encoder 40.

Turning now to FIG. 6 logic for generating the new start function and the white and black run lengths is illustrated. The new memory outputs for both the zero and 1 states and the reset input pulses $R_s$ are supplied as inputs to a series of black and white counters, each counter having an AND gate coupled to each bit stage in that counter, so that if, for example, black counter 77 had 9 stages there would be 9 parallel AND gates, designated $77_1$ through $77_9$, with the leg of the corresponding AND gate being activated when the counter has accumulated a corresponding number of pulses. This arrangement is illustrated in FIG. 6 in the form of AND gates designated $77_n$. It will be understood that there will be one each of such AND gates for each stage of each counter. The black counters 77 and 79 have the outputs of their AND gates 77 and 79 connected to OR gate $82_n$. Again it will be understood that for each stage of the counters there is an AND gate $82_n$ connected to the two corresponding AND gates $77_n$ and $79_n$. Outputs from this series of OR gates $82_n$ provide for the white run length signal to the channel encoder. In similar fashion the white counters 78 and 80 have their corresponding AND gates $78_n$ and $80_n$ supplied as inputs to OR gates $83_n$ and the output from the series of OR gates represented by OR gate $83_n$ provides for the black run length signal to the channel encoder 40.

The inputs to black counters 77 and 79 are provided from AND gates 81 and 83 respectively. These AND gates provide an output signal to the coupled counter in response to each of the three inputs to the gate being in a positive state. The 1 state input line from new memory 34 is connected to the toggle input of a flip-flop 76 which is arranged with its outputs connected back to the opposite input so that it form a divide-by-two counter and on each output line from the flip-flop 76 every other pulse signal to the 1 input will be present. One output terminal from the flip-flop 76 is connected as an actuating input signal to AND gates 81 and 82, while the other output terminal from the same flip-flop 76 provides an actuating input signal to AND gates 83 and 84. A second input to AND gates 81 and 83 is supplied directly from the 1 state line from new memory 34, while the zero state line for the same new memory 34 provides a second actuating signal to AND gates 82 and 84. The third signal to each of the AND gates 81 through 84 is supplied from a clock pulse K, the derivation of this closk pulse K being illustrated in a logic diagram of FIG. 7. The reset pulse $R_s$ resets all of the counters, as well as the flip-flop 76.

The circuitry of FIG. 6 also includes an input signal to the channel encoder indicating that a new start function has occurred. This signal, $F_{(ns)}$, is provided at the output of a multivibrator 86 which is in turn fired from the output of OR gate 85. This OR gate 85 provides an output signal in response to an output from any one of the AND gates 105, 109, 114, 119 123, 126 or 127. This output signal from the multivibrator 86 is supplied as one of the actuating input signals to each of the AND gates $77_n$, $78_n$, $79_n$ and $80_n$ and accordingly is required in order to produce the white run length and black run length signals to the channel encoder. The occurrence of the signal $F_{(ns)}$ also acts in conjunction with the corresponding one of the output signals from the flip-flop 76 to actuate either AND gate 87 or AND gate 89 which resets through the correspondingly delay circuit 88 or 90 either the black/white counter pair 77 and 78 or the black/white counter pair 79 and 80.

In FIG. 7 there is illustrated the logic circuits for producing an output signal, $F_{(\Delta)}$, indicating that there is a delta-I and delta-II output and for producing the quantitative values of ± delta-II and + delta-I and −delta-I. The logic elements in this portion of the circuit include a series of OR gates 90 through 98, all receiving inputs from particular ones of the series of AND gates 101 through 127, which constitute the output signals from the coincidence matrix. The outputs from OR gates 98 and 97 are provided as separate inputs to flip-flop 150. The input OR gate 98 sets flip-flop 150, while the input from OR gate 98 resets this flip-flop. That output from flip-flop 150, which is actuated by the signal from OR gate 98, is one input leg to AND gate 152, the other input leg being connected to the clock signal K. The output from AND gate 152 is supplied as a down counting input to up/down counter 155. The output from OR gate 90 is connected as the set input to flip-flop 151, while the output from OR gate 91 is connected to that same flip-flop 151 as a reset input. That output from flip-flop 151, which is actuated by a positive signal from OR gate 190, is supplied as one input to AND gate 153, the other input from AND gate 153 being supplied by the clock signal K' (which as will be described below, is a slightly delayed clock pulse, K). The output from AND gate 153 is connected to the up/down counter 155 as an up input.

The output from up/down counter 155 is connected as one input to AND gate $156_N$, the other input to this AND gate being supplied from the output of OR gate 92 through multivibrator 160. The output of AND gate 156 is a ± delta-II signal which is supplied to channel encoder 40. The output from multivibrator 160 provides an output signal $F_{(\Delta)}$ to the channel encoder 40, indicating a delta function. The clock pulses K and K' are produced from the circuit which includes OR gate 161 having one input connected to multivibrator 160 and the other two inputs carrying the signals $F_{(m)}$ and $F_{(ns)}$. The output from this OR gate 161 is provided through a delay unit 162 to a terminal which serves as the reset terminal $R_s$. The output from OR gate 161 is also provided as the set input to flip-flop 165, the set output being supplied as one input signal to AND gate 166, the other input to AND gate 166 being provided from a clock source 168. The output from AND gate 166 is the K output, while the K' output is derived from the output of AND gate 166 through delay unit 167. A reset pulse to flip-flop 165 is provided from channel encoder 40.

The +delta-I and −delta-I quantitative values are supplied from a logic subcircuit which includes as input elements OR gates 93, 94, 95 and 96, the output from OR gate 93 being applied as the set input to flip-flop 170 with the output from OR gate 94 being applied to that same flip-flop 170 as the reset input. The set output from flip-flop 170 is connected as one input to AND gate 173, the other input to that AND gate being supplied from the clock pulse source, K. The output from AND gate 173 is provided to the input of +delta-I counter 175. The output from delta-I counter 175 is connected as one input to AND gate $178_N$, with the other actuating input to AND gate $178_N$ being supplied from the output of multivibrator 160. The output of AND gate $178_N$ is the +delta-I value. OR gates 95 and 96 are connected in similar fashion to flip-flop 171, which has its set output connected to AND gate 172, the output of which drives −delta-I counter 176. The output from the −delta-I counter 176, connected through AND gate $179_N$ provides for the −delta-I output signal to the channel encoder.

The operation of the above elements provides generally that combinations of black and white pulses, either directly from new memory 34 and old memory 36 or through the flip-flops 60 and 61 (which provide for logic which can AND together pulses representing successive bits from one memory,) actuate various ones of the output AND gates 101 through 127 and these outputs operating through the appropriate service of OR gates and logic subsystems, as illustrated in FIGS. 6 and 7 produce the output functions and quantitative values. For example, if the old line was white and the new line is white, and on the next bit the new line shows a black bit this will actuate AND gate 103, setting flip-flop A and triggering an up count in up/down counter 155. If ten more black bits appear from the new memory, without any change in the old memory, the up/down counter 155 will accumulate these ten bits and if on the eleventh bit, the new memory returns to a white pulse, then AND gate 105 will be energized providing a reset pulse to flip-flop 151 stopping the accumulation of pulses in the up/down counter. The output from AND gate 105, connected through OR gate 85 to multivibrator 86 will generate a new start function signal, $F_{(ns)}$ providing an energizing signal to AND gates $77_n$ through $80_n$, producing the white and black run length signals needed to define the point in the line where the new start occurred. This new start signal, acting through OR gate 161 and delay 162 will then produce an $R_s$ reset pulse for the entire system.

Other combinations of counters and logic elements may be employed to produce the same function generation as that described above.

From the foregoing, it is seen that each new line is transmitted in the form of a succession of codes or code sequences respectively representing the successive segments of the line. The receiver is adapted to read these codes and interpret them by reference to the old lines previously received to ascertain and reproduce the new lines as a graphic reproduction of the original copy.

The transmission of these function codes, as compared with the prior art methods of sending digital codes for every sampled bit or run length, has the inherent capability of minimizing redundancy in the information to be transmitted. This provides a potential for minimizing the number of code bits required, regardless of the particular codes selected to represent the functions. In addition, however, by a suitable construction of codes based on the statistical frequencies of their appearance in typical graphic copy, the minimization can be more efficiently implemented. The principles are described in a paper by Huffman entitled, "A Method for the Construction of Minimum-Redundancy Codes", published in Proceedings of the Institute of Radio Engineers (September 1952). Each of the possible function signals that may be encoded, forming the code vocabulary, is listed together with its frequency of appearance in typical copy. One may then derive from this list a binary code for each function signal that is characterized by certain properties. First, the number of digits in the code is a function of its frequency of use, the most commonly used codes having the fewest digits. Second, no code of any length is found as the initial sequence of a longer code.

Within the outlines of the Huffman method described above, the construction of the particular codes may proceed in any of various ways. The actuall number of codes or "words" in the vocabulary is a matter of choice. Also, in the described embodiment the code vocabulary preferably contains certain codes in addition to those representing the functions of the segments of lines, these additional codes being used in the receiver for switching, synchronization with the transmitter, space correlation or framing of the copy, classification or identification of copy, and minimization of error propagation resulting from noise on the communication circuit. Further choices arise from the possibilities of modifying the codes, for example, to eliminate an undesired all-zero code, or to limit the maximum word length, that is, the maximum number of binary digits per code.

I claim:

1. The method of producing a compressed digital representation of a visible image, which includes the steps of:
    scanning a small spot on the image along a pattern of mutually spaced lines and producing a binary scan function for each line having a transition corresponding to each transition in the density of the image as the spot is moved progressively over the image, the intervals between transitions in said scan functions representing run lengths of uniform density.
    successively storing for simultaneous access at least two scan functions respectively representing one line in said pattern and the preceding line of said pattern,
    comparing corresponding portions of said two scan functions, said comparison being carried out progressively by,
        detecting the location and direction of transitions in said scan functions,
        determining the presence or absence of overlap between a run length of one density defined by a transition in a first direction followed by a transition in the opposite direction in said one line, and a run length defined by like transitions in the preceding line,
    measuring for each pair of so determined overlapping run lengths,
        a. the difference between the positions of the transitions in the first direction, and
        b. the difference in their lengths of said run lengths, and
    producing a digital output function representative of:
        said measured differences,
        the location and run length between pairs of transitions for portions of said scan functions in which no overlapping run lengths are present and where there is a run length of said one density in said one line, and
        an identifying signal for portions of said scan function in which no such overlap is present and where there is a run length of said one density in said preceding line.

2. The method according to claim 1, in which the output function is binary.

3. The method according to claim 2, in which the output function is produced with signs representative of the directions of said differences.

4. The method according to claim 1, in which the lines in said pattern are substantially straight and parallel.

5. The method according to claim 1, in which said spot is moved at constant velocity and said differences are measured as time differences.

6. The method according to claim 5, in which the scan functions are produced by sampling the image density at a uniform rate.

7. The method according to claim 6, in which the output function consists of portions each corresponding to a segment of the one line it represents.

8. The method according to claim 7, in which the segments are of variable width.

9. The method of producing a compressed digital representation of a visible image, which includes the steps of:
    scanning a small spot on the image along a pattern of mutually spaced lines and producing a binary scan function for each line having a transition corresponding to each transition in te density of the image as the spot is moved progressively over the image, the intervals between transitions in said scan functions representing run lengths of uniform density,
    successively storing for simultaneous access at least two scann functions respectively representing one line in said pattern and the preceding line of said pattern,
    comparing corresponding portions of said two scan functions, said comparison being carried out progressively by,
        detecting the location and direction of transitions in said scan functions,
        determining the presence or absence of overlap between a run length of one density defined by a transition in a first direction followed by a transition in the opposite direction in said one line, and a run length defined by like transitions in the preceding line,
    measuring for each pair of so determined overlapping run lengths,
        the difference between the positions of the transitions in the first direction, and
        the difference in their lengths, and
    measuring the location of first direction transitions and the following run lengths in said one line, which first direction transitions are the starting points of a run length of one density which does not overlap a run length of like density in the preceding line,
    determining when there is run length of said one density in a preceding line and no overlapping run length of like density in the said one line, and
    producing an output function indicating as separate functions:
        a. the measured differences in position and length of overlapping run lengths,
        b. the measured location and run lengths of nonoverlapping run lengths in said one line, and
        c. the existence of a nonoverlapping run length in said preceding line.

10. A method in accordance with claim 9 wherein one of said output functions (a), (b) or (c) is produced for each segment in a one line, wherein a segment is defined for said one line as the portion of the line which must be scanned to determine with respect to the preceding line, all of the information necessary to define one of said functions.

* * * * *

UNITED STATES PATENT AND TRADEMARK OFFICE
CERTIFICATE OF CORRECTION

PATENT NO. : 3,991,267
DATED : November 9, 1976
INVENTOR(S) : Charles G. Beaudette It is certified that error appears in the above-identified patent and that said Letters Patent are hereby corrected as shown below:

Column 2, line 49 "incorresponding" should read --in corresponding--;

Column 4, line 2 "inthe" should read --in the--;

Column 5, line 56 after the word "period" insert --a second--;

Column 6, line 56 after the word "pulses" insert a --,--(,);

Column 7, line 17 "quantitiative" should read --quantitative--;

Column 8, line 53 "closk" should read --clock--;

Column 9, line 15 after the word "input" insert --from--;

Column 11, line 5 "actuall" should read --actual--;

Column 11, line 31 after the word "density" delete the period (.) and insert a --,--(,);

Column 12, line 21 "te" should read --the--;

Column 12, line 26 "scann" should read --scan--.

Signed and Sealed this

Third Day of May 1977

[SEAL]

Attest:

RUTH C. MASON
Attesting Officer

C. MARSHALL DANN
Commissioner of Patents and Trademarks